(No Model.)
J. A. BARRETT.
ELECTRICAL CIRCUIT AND CABLE.
No. 482,149. Patented Sept. 6, 1892.
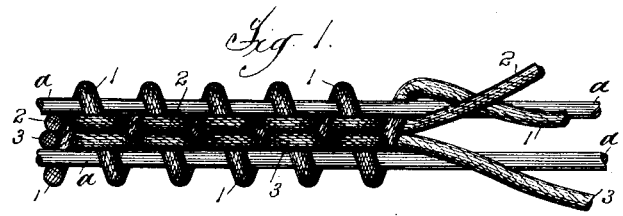
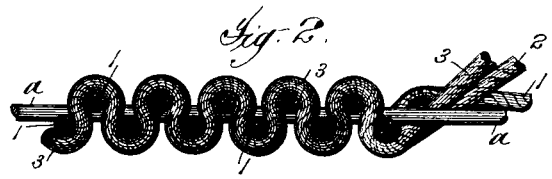
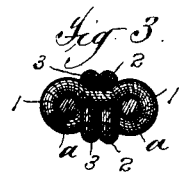
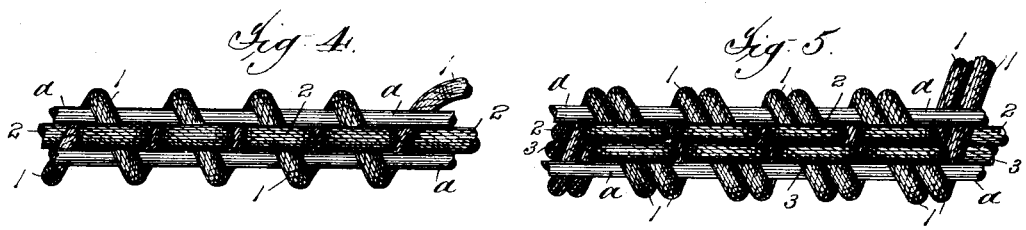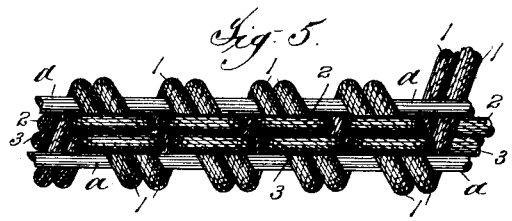
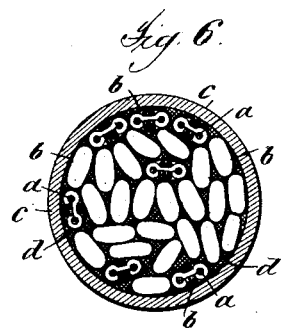
Attest:
Geo. H. Botts
C. J. Sawyer
Inventor:
John A. Barrett
by Philipp Phelps Howe
Attys

UNITED STATES PATENT OFFICE.

JOHN A. BARRETT, OF BROOKLYN, NEW YORK, ASSIGNOR TO THE STANDARD UNDERGROUND CABLE COMPANY, OF PITTSBURG, PENNSYLVANIA.

ELECTRICAL CIRCUIT AND CABLE.

SPECIFICATION forming part of Letters Patent No. 482,149, dated September 6, 1892.

Application filed January 8, 1891. Serial No. 377,086. (No model.)

*To all whom it may concern:*

Be it known that I, JOHN A. BARRETT, a citizen of the United States, residing at Brooklyn, county of Kings, and State of New York, have invented certain new and useful Improvements in Electric Circuits and Cables, fully described and represented in the following specification and the accompanying drawings, forming a part of the same.

This invention relates to the manufacture of insulated electric conductors, and especially to the construction of electric cables composed of a number of such conductors, its object being to provide an improved construction, whereby a greater number of efficient conductors may be inclosed within a given space, and, further, to provide a simple and cheap method of insulating the conductors.

While certain features of the invention are applicable to all classes of electric conductors and cables, the improvements have been designed and are especially adapted for use in electric cables employed in telephone-work, in which the cables are composed of a number of metallic circuits, the conductors forming each circuit being insulated from each other and from the conductors of the other circuits. In the construction of this class of cables it has been the practice to surround each conductor with a winding of cotton, tape, or other similar insulating material, which is generally saturated with paraffine or other suitable insulator, and the conductors thus insulated grouped together to form the cable. It is well known that retardation by induction in the metallic circuits forming the cable is reduced and the efficiency of the circuits increased as the distance and amount of insulation between the conductors is increased, and it is desirable, therefore, to separate the conductors as widely as possible. In the limited cross-area of a cable, therefore, but a comparatively small number of circuits of high efficiency can be inclosed, and it has been possible to increase the number of circuits only by a corresponding loss of efficiency. It is well known, also, that the inductive capacity tending to produce retardation is greater between the two conductors forming a circuit than between conductors of different circuits. It is evident, therefore, that the number of efficient circuits within a given space may be increased or a greater efficiency of the same number of circuits be secured by increasing the distance and amount of insulating material between the conductors of each circuit and decreasing that between conductors of different circuits, and I attain this object in the present case by a simple, convenient, and cheap method, in which the two conductors forming each circuit are woven in a single mesh of cord, tape, or other common insulating material, so that a greater thickness of insulating material lies between the conductors than outside the same.

In the construction now in use, moreover, in which the same thickness of insulating material is applied on all sides of each conductor, the shorter diameter of the circuit is necessarily increased correspondingly with the increase of the longer diameter as the conductors of the circuit are further separated. As the insulation between the conductors is increased to a point of high efficiency, therefore the thickness of the circuit is largely increased, which involves a loss of space without gain in efficiency. I weave the conductors so as to form a circuit, which is practically a flat band, and so that the insulating material between the conductors may be increased without increasing that outside the same, thus producing circuits adapted for close packing in the cable and securing the highest joint economy of space and efficiency.

While the cable embodying my invention may be of any other general construction, the invention consists in part of improvements on the cable of my patent, No. 424,751, dated April 1, 1890, and will be illustrated and described as applied thereto. In this patent the conductor is surrounded by an air-containing serving formed, preferably, by a cord wound about the conductors, so as to leave large air-spaces between the successive windings, the two conductors forming a circuit, then being inclosed within an envelope of paper or similar material, preventing or retarding the passage of the sealing material, and a number of these enveloped circuits grouped together within a protecting-sheath of lead to form the cable, the spaces between the enveloped circuits and sheath being filled with suitable sealing material.

In the accompanying drawings, forming a part of this specification, Figure 1 shows an electric circuit partially wound in accordance with my invention. Fig. 2 is a central longitudinal section of the same. Fig. 3 is a cross-section of Fig. 1. Figs. 4 and 5 show modifications, and Fig. 6 is a cross-section of my improved cable.

Referring to the drawings, $a$ $a$ are the electric conductors forming the circuit. These conductors in the construction shown in Figs. 1 to 3 are woven in a single mesh by three strands 1 2 3, the strands 2 3, lying between the conductors and the strand 1 being wound about the conductors and intermediate strands, crossing the latter alternately on opposite sides, the conductors therefore remaining straight and the weaving being entirely by the strands of insulating material.

The method of weaving is clearly shown in Figs. 1, 2, and 3, the strands 2 3 being alternately raised and lowered as the strand 1 is wound, so that the latter passes across upon one side of the strands 2 3 and returns upon the opposite side of the conductors and of the strands 2 3. In this construction it is evident that the thickness of the insulating material between the conductors $a$ will be double that outside the same, the circuits in the cable falling naturally into such position that the conductors of the different circuits are separated only by the single outside strands of insulating material. The number of strands, however, is not an essential feature, but any convenient number may be used. Thus the same result may evidently be obtained by using but two strands, as shown in Fig. 4, the intermediate strand 2 being of greater diameter than the outside strand 1. The construction shown in Figs. 1 to 3 is preferable, however, as the same distance between the conductors is secured, while the thickness of the circuit in one direction is little greater than that of a single-wound conductor. Two outside strands may be employed, as shown in Fig. 5, these strands lying side by side, so that the thickness of insulating material outside the circuit is still only that of a single strand. The single outside strand is preferred, however, for convenience in winding and because it affords greater air-spaces.

It will be seen that the circuit woven has substantially the form of a flat band, and in grouping the circuits to form a cable and twisting them, as usual in cable construction, these bands will adjust themselves so as to occupy substantially all the space within the sheath. This is shown clearly in Fig. 6, in which each pair of conductors $a$ $a$, forming a circuit and wound, as described, is inclosed within an envelope $b$, as described in my patent above referred to, and the enveloped circuits inclosed within a protecting-sheath $c$, the spaces between the envelopes and sheath being filled with sealing material $d$.

In cables of this general construction it is evident that the thickness of the envelope is added to that of the insulating material outside of but not between the conductors of the circuit. The envelope, therefore, occupies space in the cable without increasing the distance between the conductors forming the respective circuits, and consequently without increasing their efficiency.

By my invention I not only provide a means for applying the air-containing serving to the two conductors of a circuit at a single operation and with large air-spaces, but am enabled to adjust the amount of insulating material between and outside the conductors, so that the use of the envelope shall involve no waste of space, but, with the serving, shall form just the amount of insulation between the conductors of different circuits required for the highest economy of combined efficiency and number of circuits.

While it is preferable that the conductors when forming a circuit should be separated by a greater thickness of insulating material than that surrounding the conductors, as above pointed out, and I have shown the conductors thus wound, my improved method of weaving is not to be limited to this feature, as it is evident that this method of weaving a pair of conductors into a single mesh is applicable independently of this special construction, and whether the conductors form a circuit or not, and the same amount of insulating material may be used between as about the conductors, if desired.

Although the flat band construction is preferred, it will be readily understood that my improved construction may be employed without the formation of the band, as an intermediate circular strand may be used of such size that a circuit of substantially circular cross-section is produced.

What I claim is—

1. An electric circuit consisting of a pair of naked conductors and a single mesh of cord, tape, or similar insulating material woven between and about said conductors, with a greater thickness of the woven insulating material between the conductors than about the same, substantially as described.

2. An electric circuit consisting of a pair of naked conductors and a single mesh of cord, tape, or similar insulating material woven between and about the conductors and constructed to form a flat-band circuit, with a greater thickness of the woven insulating material between than about the conductors, substantially as described.

3. An electric circuit consisting of a pair of naked conductors, one or more strands of cord, tape, or similar insulating material lying between the conductors, and one or more strands wound about the conductors and intermediate strand or strands and crossing the latter alternately on opposite sides, substantially as described.

4. An electric circuit consisting of a pair of naked conductors, one or more strands of cord, tape, or similar insulating material lying between the conductors, and one or more strands of similar material wound about the conductors and intermediate strand or strands and crossing the latter alternately on opposite sides, said strands being constructed and arranged to form a greater thickness of insulating material between than outside the conductors, substantially as described.

5. An electric circuit consisting of a pair of naked conductors, two strands of cord, tape, or similar insulating material lying between the conductors, and a single strand wound about the conductors and intermediate strands and crossing the latter alternately on opposite sides, substantially as described.

6. In an electric cable, the combination of a plurality of independent circuits, each circuit consisting of a pair of conductors woven in a single mesh of cord, tape, or other insulating material, with a greater thickness between the conductors than outside the same, substantially as described.

7. In an electric cable, the combination of a plurality of independent circuits, each circuit consisting of a pair of conductors woven in a single mesh of cord, tape, or other insulating material, with two strands between the conductors and one strand outside the same, substantially as described.

8. An electric cable consisting of a plurality of independent circuits, each circuit consisting of a pair of conductors woven into a flat band, with a greater thickness of insulating material between the conductors of the same circuit than between those of different circuits, substantially as described.

9. In an electric cable, the combination of a plurality of electric circuits, each circuit consisting of a pair of naked conductors insulated by being woven in a single mesh of cord, tape, or other insulating material, forming an air-containing serving, an envelope about each circuit preventing or retarding the passage of the sealing material, a protecting-sheath inclosing the enveloped circuits, and sealing material filling the space between the envelopes and sheath, substantially as described.

10. In an electric cable, the combination of a plurality of electric circuits, each circuit consisting of a pair of conductors woven in a single mesh of cord, tape, or other insulating material, forming an air-containing serving, with a greater thickness of insulating material between than outside the conductors, an envelope about each circuit preventing or retarding the passage of the sealing material, a protecting-sheath inclosing the enveloped circuits, and sealing material filling the space between the envelopes and sheath, substantially as described.

11. In an electric cable, the combination of a plurality of electric circuits, each circuit consisting of a pair of conductors insulated by an air-containing serving, with a greater thickness of insulation between than outside the conductors, and an envelope about each circuit, substantially as described.

In testimony whereof I have hereunto set my hand in the presence of two subscribing witnesses.

JOHN A. BARRETT.

Witnesses:
J. W. MARSH,
C. C. WOLFE.